(12) United States Patent
Han et al.

(10) Patent No.: US 9,166,451 B2
(45) Date of Patent: Oct. 20, 2015

(54) STATOR OF ELECTRIC MACHINE, ELECTROMOTOR HAVING THE SAME, AND ELECTRIC VEHICLE HAVING THE ELECTROMOTOR

(75) Inventors: Seungdo Han, Seoul (KR); Jeonghyun Song, Seoul (KR); Junyoung Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 13/809,389

(22) PCT Filed: Dec. 2, 2011

(86) PCT No.: PCT/KR2011/009335
§ 371 (c)(1),
(2), (4) Date: Jan. 9, 2013

(87) PCT Pub. No.: WO2013/081225
PCT Pub. Date: Jun. 6, 2013

(65) Prior Publication Data
US 2014/0285054 A1    Sep. 25, 2014

(51) Int. Cl.
*H02K 3/12* (2006.01)
*H02K 3/28* (2006.01)
(Continued)

(52) U.S. Cl.
CPC .............. *H02K 3/28* (2013.01); *B60L 11/1803* (2013.01); *B60L 11/1877* (2013.01); *B60L 15/20* (2013.01); *H02K 3/12* (2013.01); *B60L 2240/421* (2013.01); *B60L 2240/423* (2013.01); *B60L 2270/142* (2013.01); *B60L 2270/145* (2013.01); *Y02T 10/641* (2013.01); *Y02T 10/642* (2013.01); *Y02T 10/7005* (2013.01); *Y02T 10/705* (2013.01); *Y02T 10/7275* (2013.01)

(58) Field of Classification Search
CPC ............. H02K 3/04; H02K 3/12; H02K 3/28; H02K 3/46; H02K 3/48
USPC ......... 310/201, 179, 180, 198, 206, 207, 208, 310/215, 184, 195
See application file for complete search history.

(56) References Cited

U.S. PATENT DOCUMENTS 3,325,661 A * 6/1967 Parsons .......................... 310/179
4,409,507 A * 10/1983 Godwin ......................... 310/205
(Continued)

FOREIGN PATENT DOCUMENTS

CN    1472871 A    2/2004
CN    1969440 A    5/2007
(Continued)

OTHER PUBLICATIONS

JP 2004-364464 Machine translation.*
(Continued)

*Primary Examiner* — Terrance Kenerly
*Assistant Examiner* — Ahmed Elnakib
(74) *Attorney, Agent, or Firm* — Dentons US LLP

(57) ABSTRACT

A stator of an electric machine of the power saving interval may include a stator core having a plurality of slots, and a stator winding wound around the slot, wherein the stator winding has a plurality of winding portions connected in parallel with one another for each phase, and each of the winding portions has a segment conductor inserted into three or more slots for each pole. As a result, it may be possible to increase the number of rotations and reduce the external size thereof while maintaining the same output.

10 Claims, 12 Drawing Sheets

(51) Int. Cl.
*B60L 11/18* (2006.01)
*B60L 15/20* (2006.01)

(56) References Cited

U.S. PATENT DOCUMENTS

| | | | |
|---|---|---|---|
| 5,764,036 A * | 6/1998 | Vaidya et al. | 322/90 |
| 6,417,592 B2 * | 7/2002 | Nakamura et al. | 310/184 |
| 6,894,415 B2 * | 5/2005 | Koike | 310/184 |
| 6,894,417 B2 * | 5/2005 | Cai et al. | 310/198 |
| 6,979,926 B2 * | 12/2005 | Ogawa et al. | 310/180 |
| 6,995,492 B1 | 2/2006 | Kouda et al. | |
| 7,190,101 B2 * | 3/2007 | Hirzel | 310/268 |
| 7,391,138 B2 * | 6/2008 | Seguchi | 310/71 |
| 7,687,962 B2 * | 3/2010 | Imai et al. | 310/206 |
| 8,174,159 B2 * | 5/2012 | Xu et al. | 310/198 |
| 8,253,298 B2 * | 8/2012 | Saban et al. | 310/216.069 |
| 8,283,830 B2 * | 10/2012 | Fujisawa et al. | 310/184 |
| 8,760,019 B2 * | 6/2014 | Mori et al. | 310/71 |
| 2002/0017825 A1 | 2/2002 | Oohashi et al. | |
| 2005/0194857 A1 * | 9/2005 | Mori et al. | 310/201 |
| 2005/0258703 A1 * | 11/2005 | Kouda et al. | 310/180 |
| 2009/0288893 A1 * | 11/2009 | Wyall et al. | 180/65.22 |
| 2011/0175481 A1 * | 7/2011 | Kebukawa | 310/156.45 |
| 2012/0038168 A1 * | 2/2012 | Morishita et al. | 290/55 |
| 2012/0242183 A1 * | 9/2012 | Tokumasu et al. | 310/195 |
| 2012/0274171 A1 * | 11/2012 | Ishikawa et al. | 310/198 |
| 2014/0361646 A1 * | 12/2014 | Saito et al. | 310/51 |

FOREIGN PATENT DOCUMENTS

| | | | |
|---|---|---|---|
| JP | 2003-125550 A | | 4/2003 |
| JP | 2004-364464 | * | 12/2004 |
| KR | 10-2001-0062251 A | | 7/2001 |
| KR | 10-2002-0013696 A | | 2/2002 |
| KR | 10-2006-0100460 A | | 9/2006 |

OTHER PUBLICATIONS

Machine translation for JP 2004-364464.*
US 6,774,528, Feb. 7, 2006, Kouda et al. (withdrawn).

* cited by examiner

A STATOR OF ELECTRIC MACHINE, ELECTROMOTOR HAVING THE SAME, AND ELECTRIC VEHICLE HAVING THE ELECTROMOTOR

CROSS-REFERENCE TO RELATED APPLICATIONS

This application is a 35 U.S.C. §371 National Stage Entry of International Application No. PCT/KR2011/009335, filed Dec. 2, 2011, which is hereby incorporated by reference for all purposes as if fully set forth herein.

TECHNICAL FIELD

The present disclosure relates to a stator of an electric machine, an electromotor having the same, and an electric vehicle having the electromotor, and more particularly, to a stator of an electric machine, an electromotor having the same, and an electric vehicle having the electromotor capable of increasing the number of rotations and reducing the size thereof.

BACKGROUND

As is generally known, an electric generator such as an alternator and/or a generator, and an electromotor (hereinafter, referred to as an "electric machine") such as a motor and/or a linear motor may be configured with a stator and a rotor configured to relatively move with respect to the stator.

The stator of the electric machine may be configured with a stator core having a plurality of slots, and stator windings wound around the slots.

The stator windings may be typically configured by a method of winding a wire (stranded wire) having a relatively thin diameter around an internal portion of the slot a multiple number of times and a method of winding a wire around the tooth (pole) in a concentrated manner.

However, in this type of stator winding method in the related art, the operation efficiency may be reduced because a ratio of an occupied area (cross-sectional area) of the conductor (coil) with respect to a cross-sectional area of the slot is relatively small. Furthermore, there is a limit in increasing a cross-sectional area ratio of the conductor with a conventional stator winding method using a wire having such a thin diameter, thereby limiting the enhancement of the output density and efficiency.

But for an electromotor for electric vehicles requiring a high output density and high efficiency, it may be very important to increase a ratio of a cross-sectional area of the conductor with respect to the slot.

Considering such problems, there are known methods of inserting a rectangular copper wire having a relatively large width (diameter) into a slot to form a stator winding (for example, U.S. Published Patent Application No. 2003/0214196, filed May 15, 2003).

However, even using a rectangular copper wire, there is a problem in which the size of the stator and rotor in an electromotor should be increased to enhance the output of the electromotor.

And with a conventional stator winding method using a rectangular copper wire, it is not easy to control the number of turns, thus resulting in a limit on the high-speed operation (for example, above 7000 rpm (revolution per minute).

SUMMARY

Accordingly, an object of the present disclosure is to provide a stator of an electric machine, an electromotor having the same, and an electric vehicle having the electromotor capable of increasing the number of rotations.

Another object of the present disclosure is to provide a stator of an electric machine, an electromotor having the same, and an electric vehicle having the electromotor capable of reducing the external size thereof while maintaining the same output.

In order to accomplish the foregoing object of the present disclosure, there is provided a stator of an electric machine including a stator core having a plurality of slots and a stator winding in which a winding having a rectangular shaped cross section or circular shaped cross section is wound in series around the slot, wherein the stator winding has a plurality of winding portions connected in parallel with one another for each phase, and each of the winding portions has a plurality of segment conductors inserted into three or more slots for each pole. Each of the segment conductors may be configured to have a rectangular cross section.

The segment conductor may be configured to have a first layer through a fourth layer separated from one another in a radial direction within each slot. Each of the segment conductors may include a first conductor having a pair of insertion portions inserted into different slots from each other, and a connection portion connecting the insertion portions to each other, and extension portions extended from the insertion portions, respectively. Each of the segment conductors may further include a second conductor having an insertion portion inserted into the slot, and a plurality of extension portions extended from both end portions of the insertion portion, respectively.

The stator winding may be configured to have a plurality of lead wires connecting each phase power to a winding portion.

The stator winding may be configured to have a first winding portion and a second winding portion connected to in parallel with each other, and each lead wire may have a power connecting portion connected to a power source, and a first branch portion and a second branch portion branched from the power connecting portion and connected to one end of each of the first winding portion and the second winding portion, respectively.

The stator winding may be configured to have a neutral line (or a neutral conductor) connecting each of the other ends of the first winding portion and the second winding portion.

The neutral line may be configured to have a first branch portion through a sixth branch portion connected to each phase of the first winding portion and the second winding portion.

The first winding portion and the second winding portion may be disposed such that the poles of the same phase are separated from one another by one slot or two slots in a circumferential direction of the stator core.

According to another embodiment of the present disclosure, there is provided a stator of an electric machine including a stator core having a plurality of slots, and a stator winding in which a winding having a rectangular shaped cross section or circular shaped cross section is wound in series around the slot. The stator winding may have a plurality of winding portions connected in parallel with one another for each phase, and each of the winding portions may have a plurality of poles. Further, each of the winding portions may have a first layer through a fourth layer, and has a plurality of segment conductors inserted into the slot such that the number of slots is three or more for each pole and each phase. When one of the plurality of poles is disposed at four slots, a first layer and a second layer of the first slot among the four slots have the same phase along a circumferential direction of the stator core, and a third layer and a fourth layer thereof have the same phase, and the second layer and the third layer thereof have different phases.

That is, a first layer through a fourth layer of the second slot and the third slot among the four slots of the one pole may be configured to have the same phase.

According to still another embodiment of the present disclosure, there is provided a stator of an electric machine including a stator core having a plurality of slots, and a stator winding in which a winding having a rectangular shaped cross section or circular shaped cross section is wound in series around the slot. The stator winding may have a plurality of winding portions connected in parallel with one another for each phase, and each of the winding portions may have a plurality of poles. Each of the winding portions may have a first layer through a fourth layer, and a plurality of segment conductors inserted into the slot such that the number of slots is three or more for each pole and phase. When one of the poles is disposed at five slots, a first layer and a second layer of the first, second, fourth, and fifth slots among the five slots of the one pole have the same phase along a circumferential direction of the stator core, and a third layer and a fourth layer thereof have the same phase, and the second layer and the third layer thereof have different phases.

That is, a first layer through a fourth layer of the third slot among the five slots of the one pole may be configured to have the same phase.

According to yet still another embodiment of the present disclosure, there is provided a stator of an electric machine, including a stator core having a plurality of slots, and a stator winding in which a winding having a rectangular shaped cross section or circular shaped cross section is wound in series around the slot. The stator winding may have a plurality of winding portions connected in parallel with one another for each phase, and each of the winding portions may have a plurality of poles. Each of the winding portions may have a first layer through a fourth layer, and a plurality of segment conductors inserted into the slot such that the number of slots is three or more for each pole and phase. When one of the plurality of poles is disposed at three slots, a first layer through a fourth layer of the three slots of the one pole all have the same phase.

According to another embodiment of the present disclosure, there is provided an electromotor including a stator of the electric machine, and a rotor rotatably disposed with respect to the stator. The stator and rotor of this embodiment are configured to rotate between 12000 and 24000 rpm.

Here, the stator may be configured to have 8 poles and 72 slots.

According to yet another embodiment of the present disclosure, there is provided an electric vehicle including a vehicle body, a battery provided in the vehicle body, and the electromotor provided in the vehicle body to provide a driving force to the vehicle body.

The electric vehicle may further include an inverter provided in the vehicle body and connected to the battery and the electromotor to provide the driving power of the electromotor. The inverter may be configured to provide alternating current power at frequencies of 500 to 1000 Hz to the electromotor.

The vehicle body may be configured to have a plurality of wheels, and may further include a decelerator provided between the electromotor and the wheel, wherein the decelerator has a deceleration ratio of 5.5:1 to 10:1.

According to another embodiment of the present disclosure, there is provided an electromotor including a stator comprising a stator core having a plurality of slots and a stator winding in which a winding having a rectangular shaped cross section or circular shaped cross section is wound in series around the slot. The electromotor further includes a rotor rotatably disposed with respect to the stator, wherein the stator core has 36 through 72 slots, and the stator winding has a plurality of winding portions connected in parallel with one another. 2 to 8 winding portions are connected in parallel for each phase, and the stator winding has 3 to 10 poles. Alternating current power of 500 to 1000 Hz is applied to the stator winding, and the rotor is rotatably configured to operate between 10000 and 24000 rpm.

According to yet another embodiment of the present disclosure, there is provided an electric vehicle including a vehicle body, a battery provided in the vehicle body, and the electromotor provided in the vehicle body to provide a driving force to the vehicle body. The electric vehicle may further include a decelerator having a deceleration ratio of 5.5:1 to 10:1.

As described above, according to an embodiment of the present disclosure, a stator winding may have a plurality of winding portions connected in parallel for each phase, and each of the winding portions may have a segment conductor disposed at three or more slots to increase the number of rotations, thereby enhancing the output of the electromotor.

As such, it may be possible to reduce a cross sectional area of each segment conductor, thereby suppressing an increase of the alternating current resistance by a skin effect as well as enhancing the efficiency.

Furthermore, when the same output is maintained, it may be possible to reduce a size of the electromotor, namely, the stator and rotor.

Also, a lead wire and/or a neutral line connected to a plurality of winding portions at the same time may be provided therein to expedite and facilitate a stator winding and connecting work.

DETAILED DESCRIPTION

Hereinafter, an embodiment of the present disclosure will be described in detail with reference to the accompanying drawings.

Figure 1:
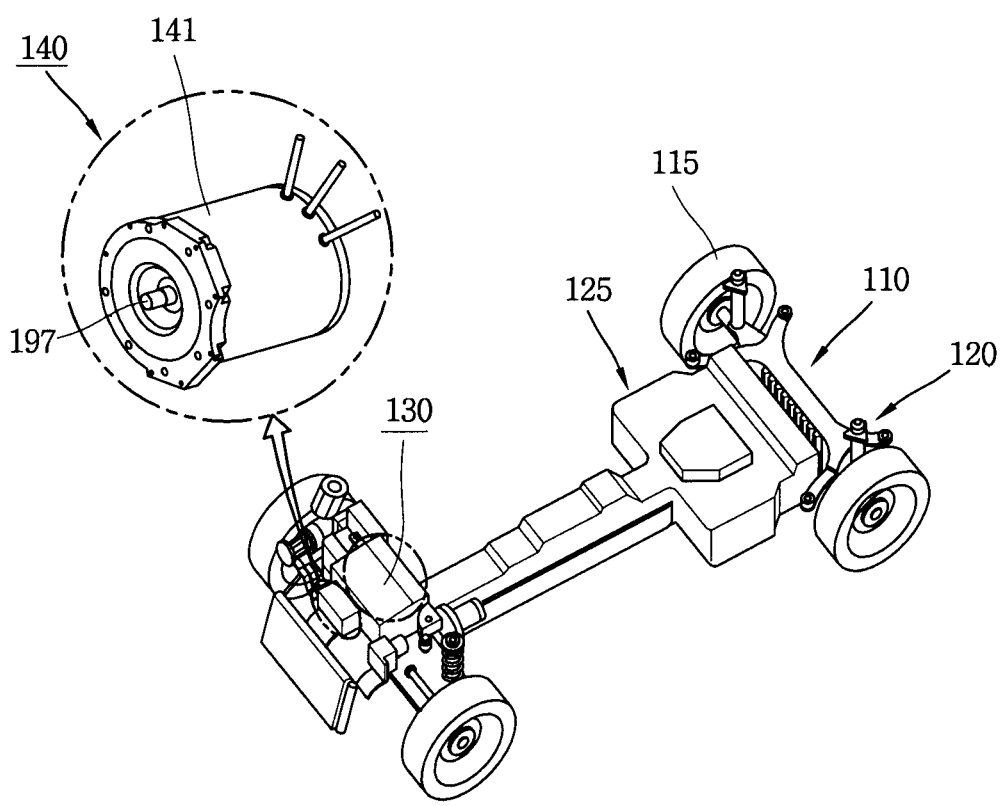
FIG. 1 is a schematic configuration diagram illustrating an electric vehicle according to an embodiment of the present disclosure.

As illustrated in FIG. 1, an electric vehicle having an electromotor according to an embodiment of the present disclosure may include a vehicle body 110, a battery 125 provided in vehicle body 110, and an electromotor 140 provided in vehicle body 110 to provide a driving force to vehicle body 110.

A passenger space (not shown) may be provided in an upper region of vehicle body 110.

A plurality of wheels 115 may be provided at vehicle body 110 to enable driving. Wheels 115 may be disposed at both sides of the front and rear regions, respectively, of vehicle body 110.

A suspension device 120 may be provided between vehicle body 110 and wheels 115 to absorb vibrations and shocks generated while driving.

A battery 125 may be provided in vehicle body 110 to supply power. Battery 125 may be configured with a secondary battery to allow charging.

An electromotor 140 may be provided in vehicle body 110 to provide a driving force to vehicle body 110, more particularly, to wheels 115.

A deceleration device or decelerator 135 may be provided at one side of electromotor 140 (more particularly, at the output side) to transfer a rotational force of electromotor 140 to wheels 115 with a predetermined deceleration ratio.

Decelerator 135 may be configured to have a deceleration ratio of 5.5:1 to 10:1. Decelerator 135 may preferably have a deceleration ratio, for example, 8.5:1.

An inverter device 130 connected to battery 125 and electromotor 140 may be provided in the vehicle body 110. Inverter device 130 may be configured to convert a direct current power source provided from the battery 125 into a driving power source suitable for driving the electromotor 140 and provide it to the electromotor 140.

The inverter device 130 may be configured to provide alternating current power having a range of frequencies of, for example, 500 to 1000 Hz to electromotor 140. More particularly, inverter device 130 may be configured to provide alternating current power of 800 Hz to electromotor 140 as a driving power source.

Figure 2:
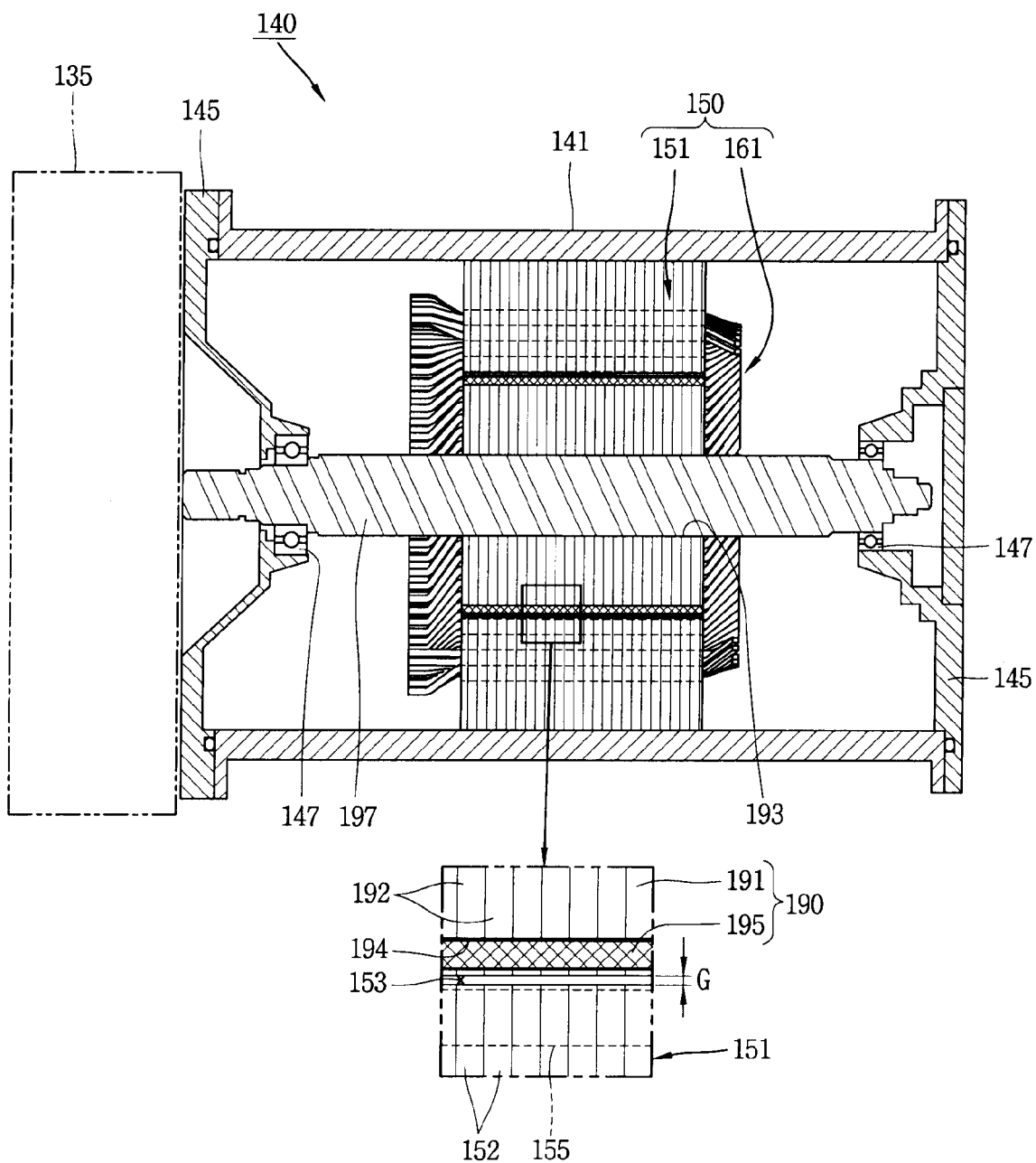
FIG. 2 is a cross-sectional view illustrating the electromotor in FIG. 1.

As illustrated in FIG. 2, electromotor 140 may include a stator 150, and a rotor 190 rotatably disposed with respect to stator 150. Stator 150 and rotor 190 may be rotatably configured to operate between 12000 and 24000 rpm.

Electromotor 140 may have an enclosure 141 for forming an accommodation space therein. Enclosure 141 may be configured in a cylindrical shape, for example. More specifically, enclosure 141 may be configured to have a cylindrical shape with open opposing ends in the axial direction.

A cover or bracket 145 may be configured at both end portions of enclosure 141. Bracket 145 may be combined with both end portions of enclosure 141 in a separable manner.

A bearing 147 for rotatably supporting rotor 190 may be provided in bracket 145. Rotor 190 may be configured to have a rotor core 191 and a magnet 195 provided in rotor core 191.

A rotation shaft 197 may be provided in rotor core 191. A shaft hole 193 into which rotation shaft 197 is inserted may be formed to penetrate rotor core 191. Both ends of rotation shaft 197 may be rotatably supported by bearing 147.

A magnet insertion portion 194 may be provided in rotor core 191 into which magnet 195 can be inserted along the axial direction.

According to the present embodiment, rotor 190 is configured with a so-called interior permanent magnet (IPM) type rotor 190 having a plurality of magnets 195 inserted into rotor core 191 in the axial direction, but rotor 190 may be also configured with a so-called surface permanent magnet (SPM) type rotor (not shown) in which a magnet (not shown) is provided at an outer surface of rotor core 191. Furthermore, it may be configured with a so-called induction rotor type rotor (not shown) having rotor core 191, a plurality of conductor bars and an end ring. Magnet 195 may be configured in a rectangular plate shape, for example.

Magnets 195 may be separated from one another with the same intervals along a circumferential direction of rotor core 191. Rotor 190 may be configured with eight magnets 195, and different magnetic poles (N and S poles) may be alternately disposed along a circumferential direction of rotor core 191.

Stator 150 may include a stator core 151 having a plurality of slots 155, and a stator winding 161 wound around each slot 155. Stator winding 161 may have a plurality of winding portions (for example, 163 and 164) connected in parallel with one another for each phase of the 3-phase alternating current power (for example, u-phase 162a, v-phase 162b, w-phase 162c), and each of the winding portions 163, 164 may be configured to have a segment conductor 170 inserted into three or more slots 155 for each pole.

An accommodation space 153 in which rotor 190 is rotatably accommodated may be formed in stator core 151. Stator core 151 may be formed of a plurality of electrical steel sheets 152 using an insulating layer method. Electrical steel sheets 152 may have a circular disk (plate) shape formed with accommodation space 153. Stator core 151 may have a plurality of slots 155 and teeth 156 formed around accommodation space 153. Slots 155 and teeth 156 may be alternately disposed with one another along a circumferential direction of stator core 151. Slots 155 may be configured to have substantial length in the radial direction.

Stator winding 161 may have a plurality of winding portions 163, 164 connected in parallel with one another for each phase.

Figure 3:
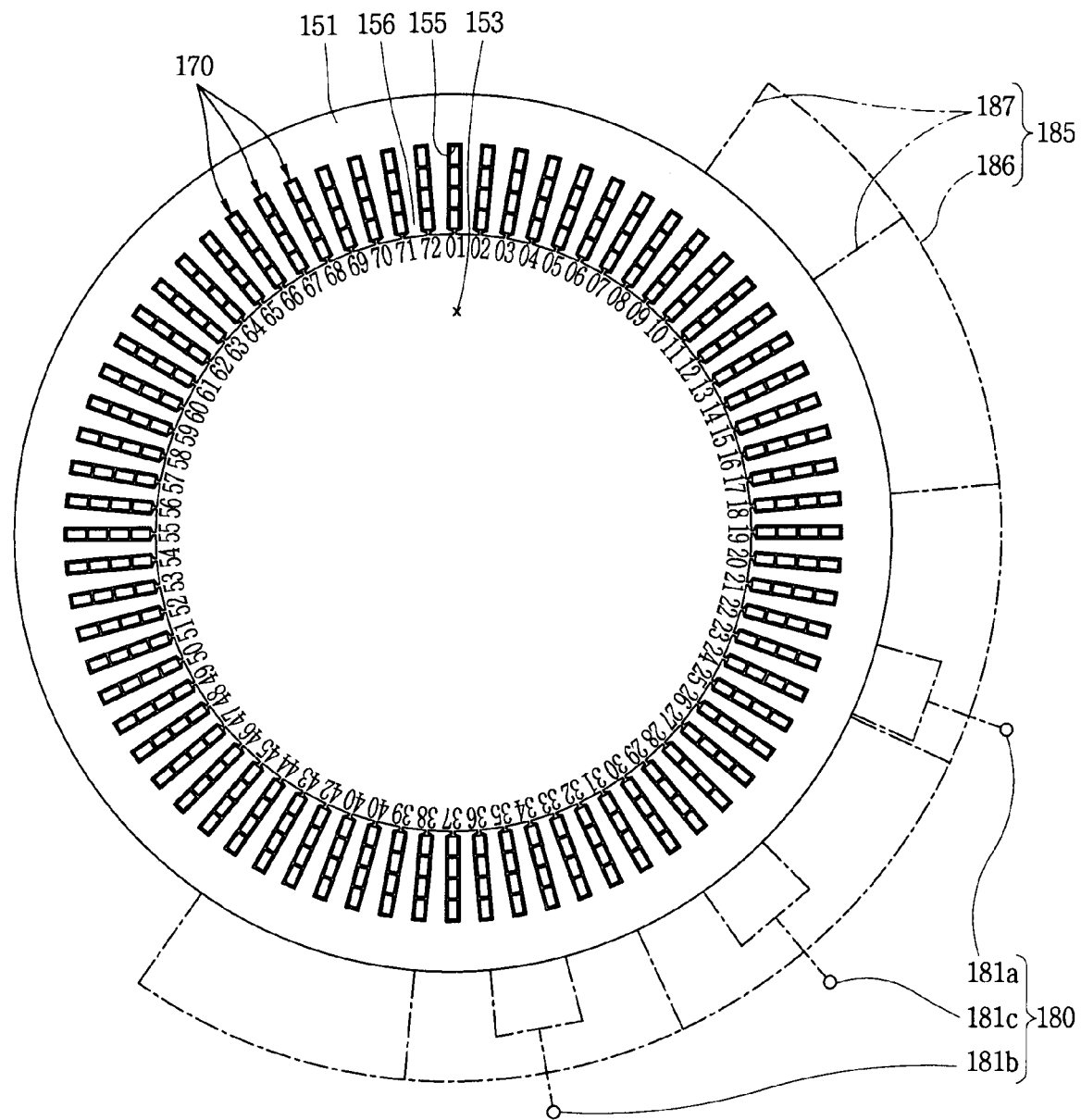
FIG. 3 is a schematic configuration diagram illustrating a stator of the electromotor in FIG. 2.
Figure 8:
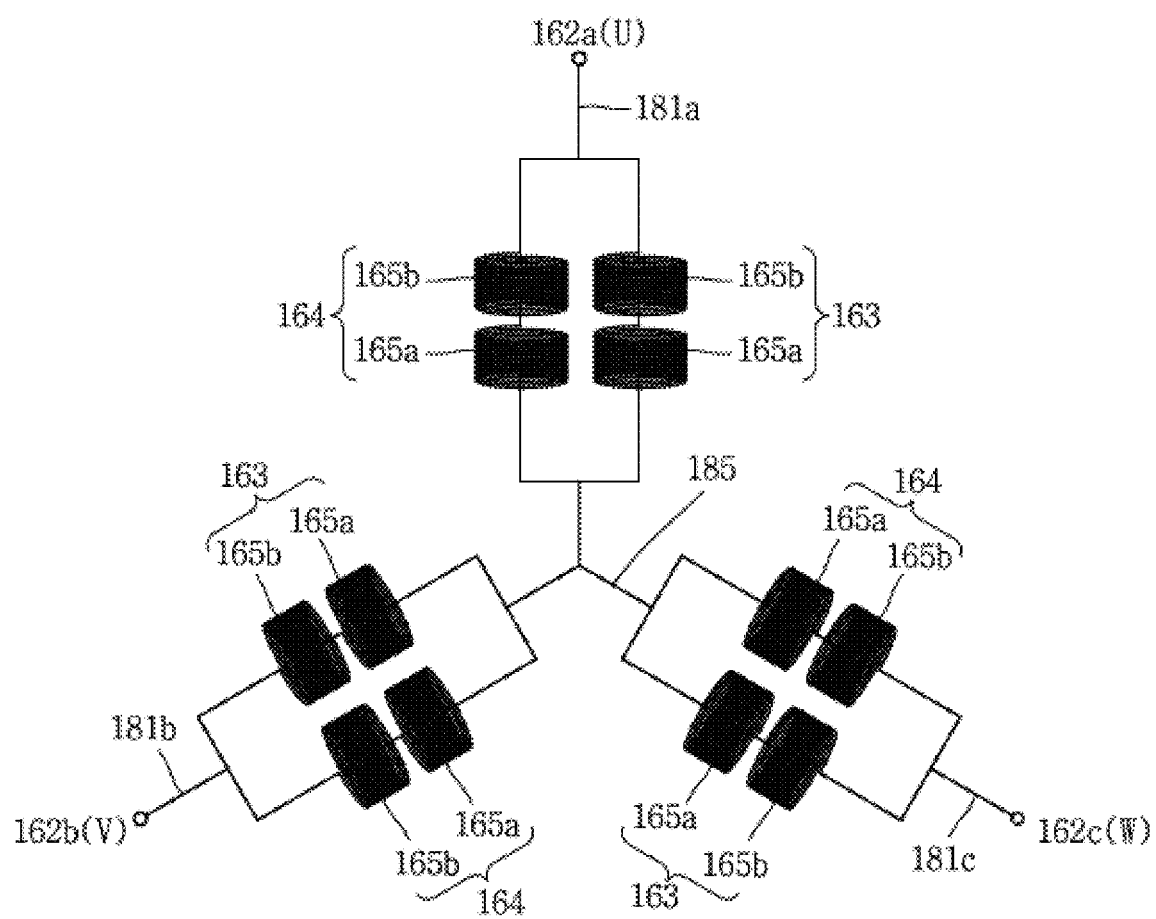
FIG. 8 is a view schematically illustrating the connection configuration of a stator winding of the electromotor in FIG. 2.

For example, stator winding 161 may be configured to have a first winding portion 163 and a second winding portion 164 for each phase (u-phase 162a, v-phase 162b, w-phase 162c) as illustrated in FIGS. 3 and 8.

According to the present embodiment, stator winding 161 is configured in two parallel winding portions to have first winding portion 163 and second winding portion 164 connected in parallel with one another, but may be also configured with four or eight winding portions in parallel.

Stator winding 161 may have lead wires 180 connecting first winding portion 163 and second winding portion 164 to inverter device 130 for each phase to apply a driving power source to each phase. Stator winding 161 may be configured with three lead wires 180. More specifically, the lead wires controller 180 may have a u-phase lead wire 181a, a v-phase lead wire 181b, and a w-phase lead wire 181c.

Figure 4:
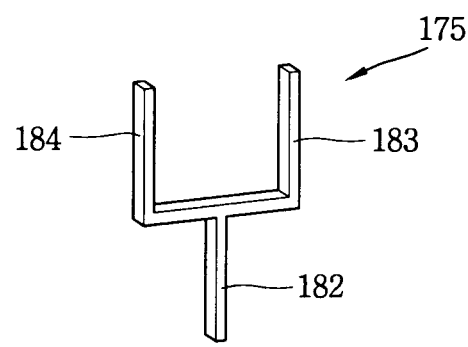
FIG. 4 illustrates a lead wire in FIG. 3.

At least one lead wire 180, for example, u-phase lead wire 181a, may be configured to have an inverter connection portion 182 connected to inverter device 130, and a first branch portion 183 and a second branch portion 184 branched from inverter connection portion 182 and connected to first winding portion 163 and second winding portion 164, respectively, as illustrated in FIG. 4. Lead wire 180 may be configured with a rectangular copper wire having a rectangular cross section, for example.

Stator winding 161 may have a neutral wire 185 or neutral line 185 connecting each of the ends of first winding portion 163 and second winding portion 164 for each phase. Neutral line 185 may be configured in the form of a line to connect winding portions 163, 164 for each phase, but may be a neutral point of a so-called Y-connection method.

Figure 5:
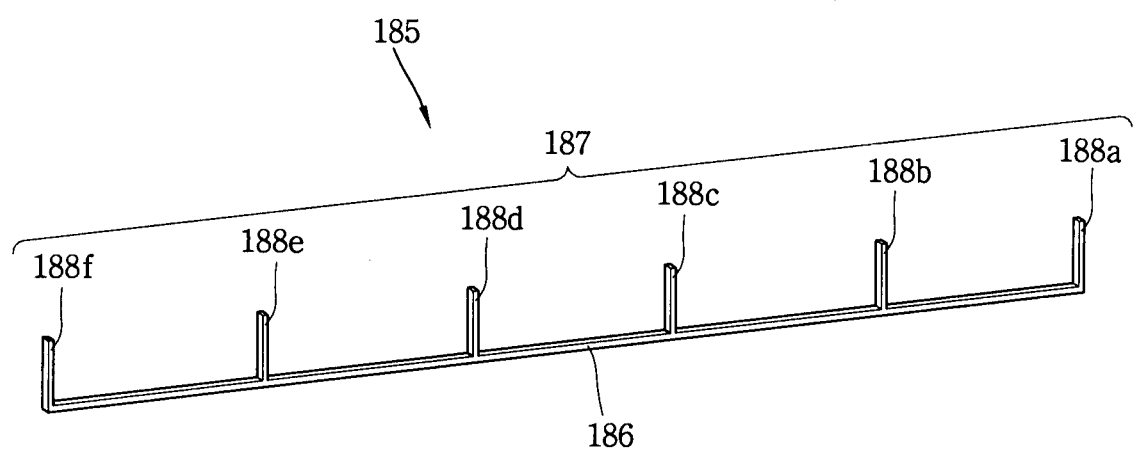
FIG. 5 illustrates a neutral line in FIG. 3.

Neutral line 185 may have a branch portion 187 branched to connect each of the ends of first winding portion 163 and second winding portion 164 for each phase, and a connection portion 186 connecting branch portion 187, for example, as illustrated in FIG. 5. Branch portion 187 may have a first branch portion 188a through a sixth branch portion 188f connected to each of winding portions 163, 164 for each phase. Neutral line 185 may be disposed along a circumferential direction of stator core 151. In FIG. 5, each of branch portion 187 and connection portion 186 is configured in a linear shape, but connection portion 186 may be properly curved to correspond to a circumference of stator core 151. Furthermore, an interval between each branch portion 187 and a length of the branch portion 187 may be properly controlled.

Stator winding 161 may have a plurality of poles, and first winding portion 163 and second winding portion 164 for each phase may be configured to have a segment conductor 170 inserted into the slot 155 such that the number of slots is equal to or greater than three for each pole and phase. For example, first winding portion 163 and second winding portion 164 may be configured such that at least twelve segment conductors 170 are inserted to three to five slots, respectively, during the insertion of four segment conductors 170 for each slot.

For example, stator winding 161 may be configured to have four poles, six poles or eight poles. Stator 150 may be configured to have three slots 155 or four slots 155 for each phase (for example, u-phase 162a, v-phase 162b, w-phase 162c) per one pole.

More specifically, on the assumption that stator 150 is configured with stator core 151 having an outer diameter of 200 to 300 mm, the number of rotations of rotor 190 operating between 10000 and 24000 rpm, decelerator 135 with a deceleration ratio of 5.5:1 to 10:1, and inverter device 130 with a frequency control section of 500 to 1000 Hz, stator 150 may be configured with stator winding 161 having 4 poles, and stator core 151 having 36 slots. Therefore there are three slots for each pole and each phase, and any one of two, four, or eight stator windings 161 in parallel.

Furthermore, stator 150 may be configured with stator winding 161 having 4 poles and stator core 151 having 48 slots. Therefore there are four slots for each pole and phase, and either two or four stator windings 161 in parallel.

If stator 150 includes stator winding 161 with 6 poles, and stator core 151 having 54 slots, then there are two stator windings 161 in parallel when there are three slots for each pole and each pole.

If stator 150 is configured such that stator winding 161 has 6 poles and stator core 151 has 72 slots, then there are either two or four stator windings 161 in parallel when there are four slots for each pole and each phase.

Furthermore, the stator 150 may be configured with stator winding 161 having 8 poles and stator core 151 having 72 slots. In such a case, there will be two stator windings 161 in parallel when there are three slots for each pole and each phase.

Hereinafter, a case where the electromotor 140 according to the present embodiment is configured with stator winding 161 having 8 poles, three slots for each pole and each phase, stator core 151 having a total of 72 slots, and two stator windings 161 in parallel will be described as an example. Furthermore, electromotor 140 according to the present embodiment may be configured such that a driving power source (alternating current power) at a frequency of 800 Hz is received from inverter device 130, and rotor 190 is rotated at 12000 rpm.

A plurality of segment conductors 170 may be inserted into each slot 155 of stator core 151. Segment conductors 170 within each slot 155 may be separated from one another in the radial direction.

Figure 9:
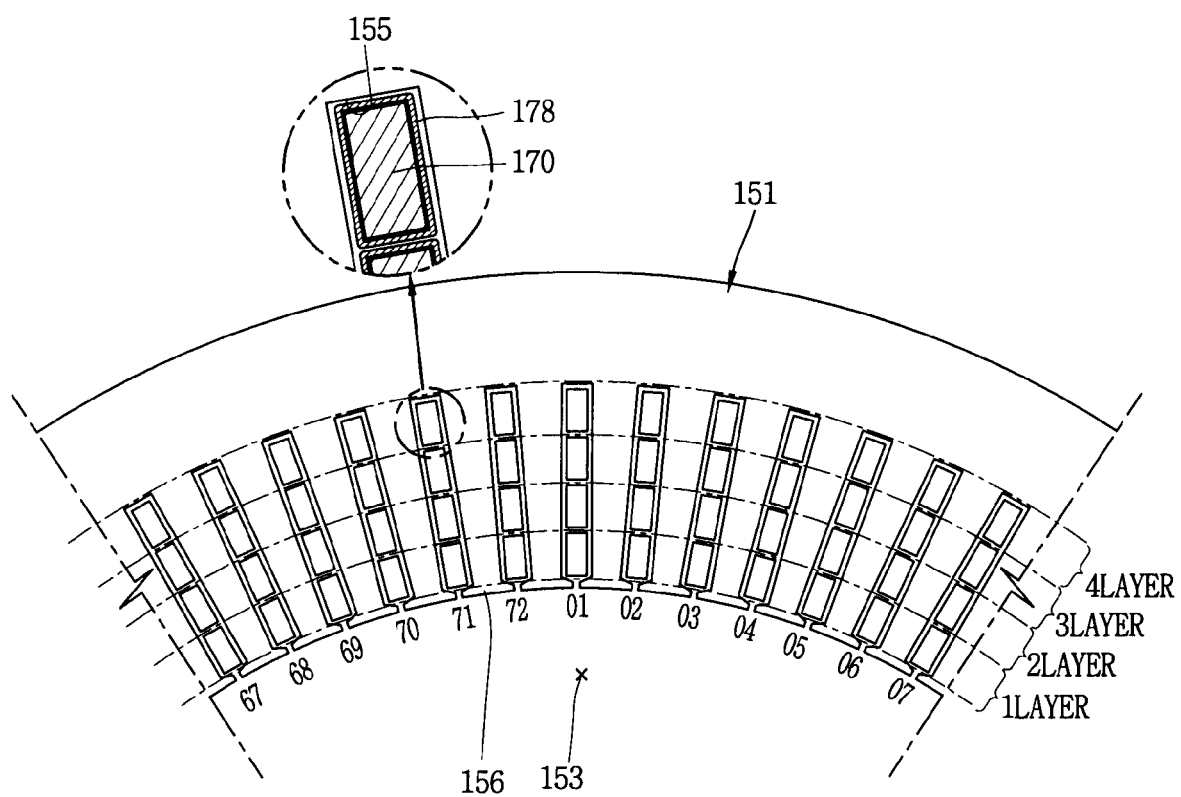
FIG. 9 is a partially enlarged view of FIG. 3.

For example, as illustrated in FIG. 9, four segment conductors 170 may be inserted into each slot 155 and separated in the radial direction. Here, four segment conductors 170 disposed in the radial direction within each slot 155 of stator core 151 may be disposed on the same circumference from the inside to the outside along the radial direction to form a first layer through a fourth layer. Hereinafter, segment conductor 170 disposed closest to the side of accommodation space 153 may be referred to as a first layer, and segment conductor 170 disposed closest to the circumference of stator core 151 may be referred to as a fourth layer. A second layer and a third layer may be disposed, respectively, between the first layer and the fourth layer.

An insulating member 178 may be provided between each of the segment conductors 170 and stator core 151 to provide insulation therebetween.

Segment conductor 170 may be inserted at one side of stator core 151 and protrude from the other side thereof along the axial direction.

Figure 6:
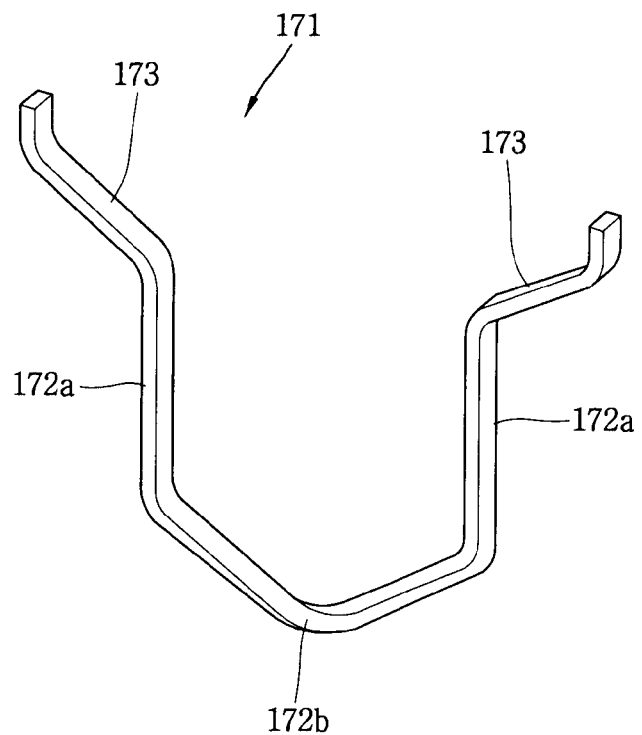
FIG. 6 illustrates a first conductor of the segment conductor in FIG. 2.

For example, segment conductor 170 may be configured with a first conductor 171 having a pair of insertion portions 172a inserted into different slots 155 from each other, a connection portion 172b connecting insertion portions 172a to each other, and extension portions 173 extended from insertion portions 172a, respectively, as illustrated in FIG. 6.

Figure 10A:
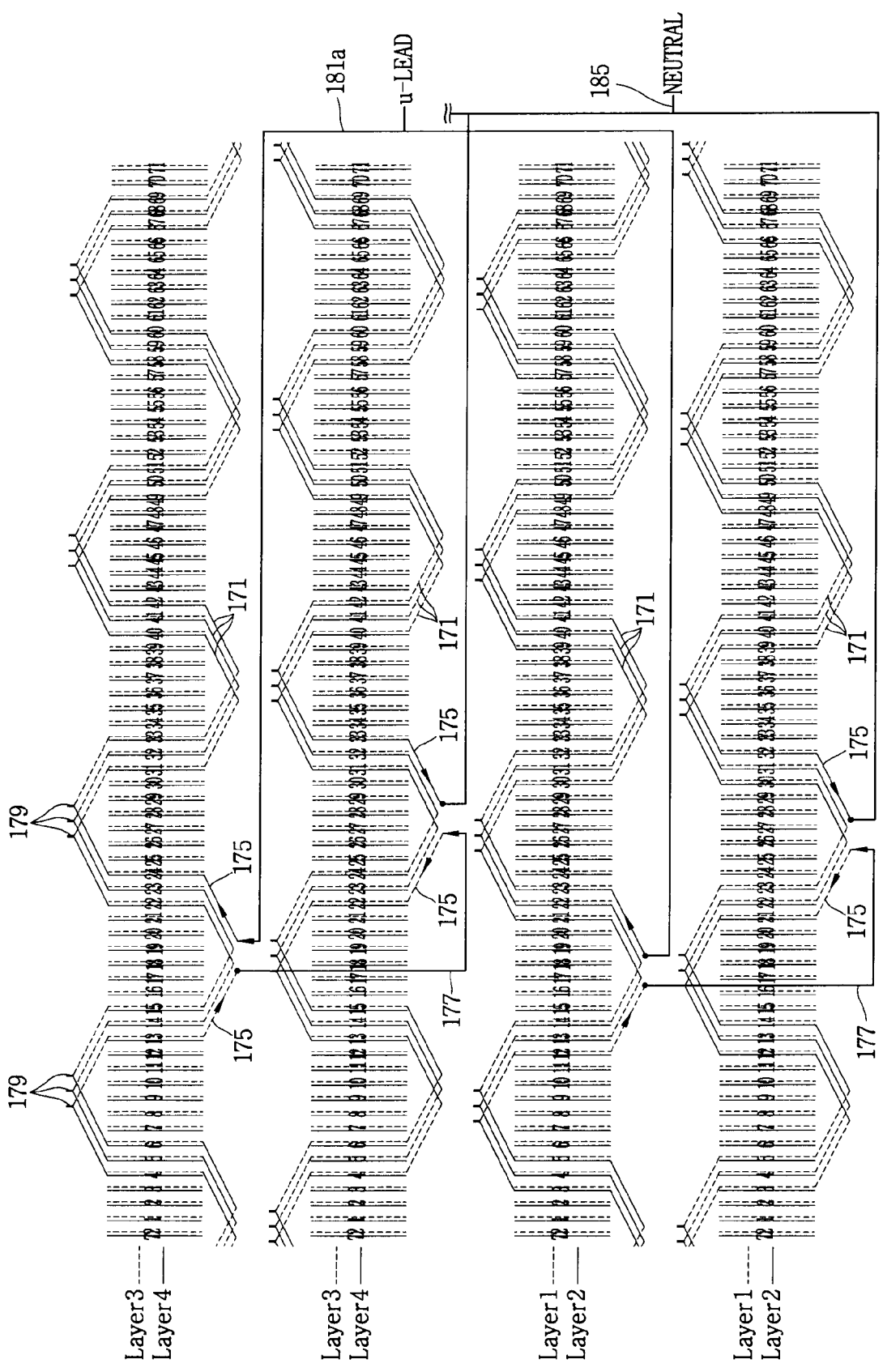
FIGS. 10A through 10C are connection diagrams illustrating a stator winding in FIG. 2.
Figure 10B:
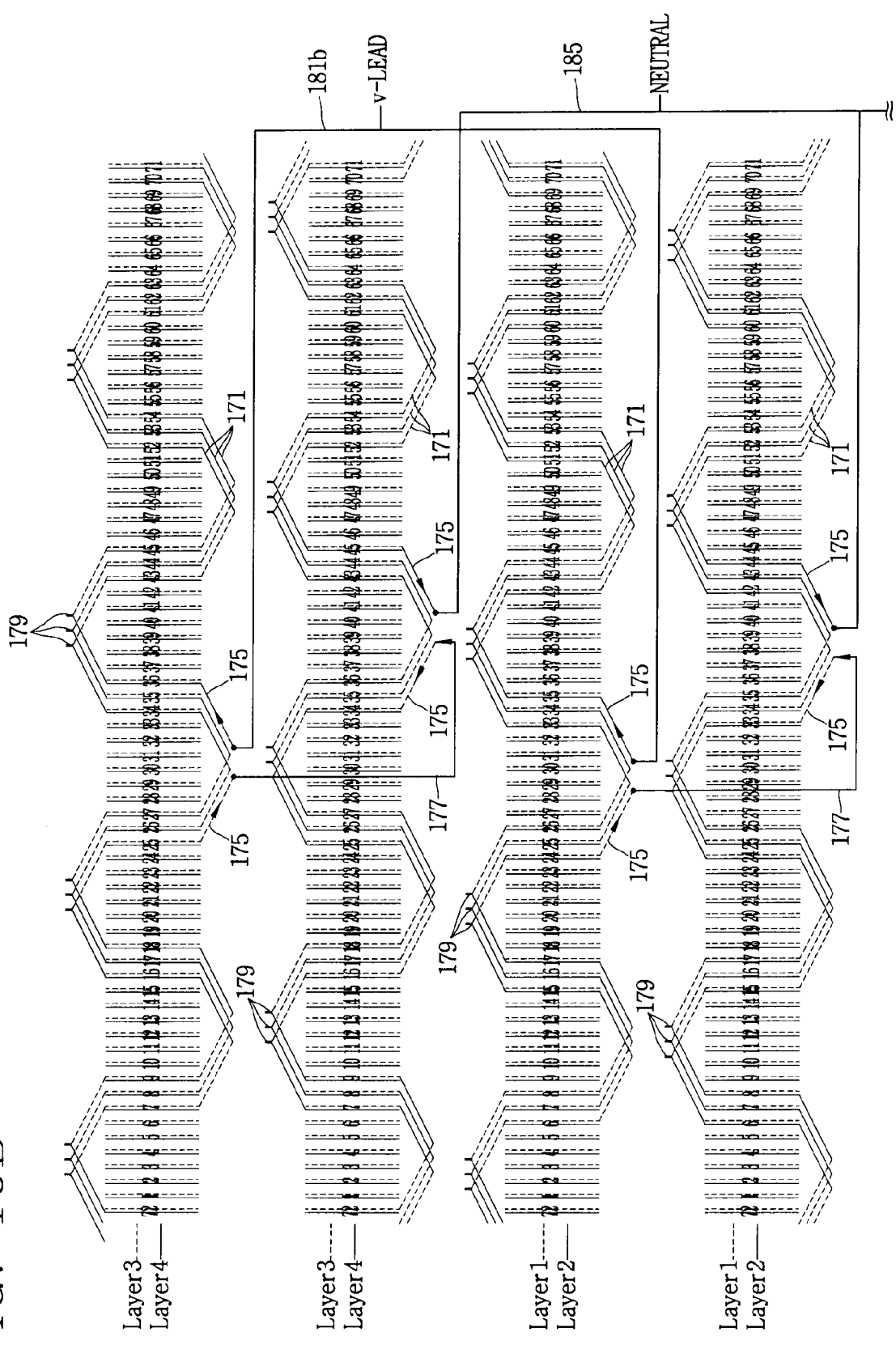
Figure 10C:
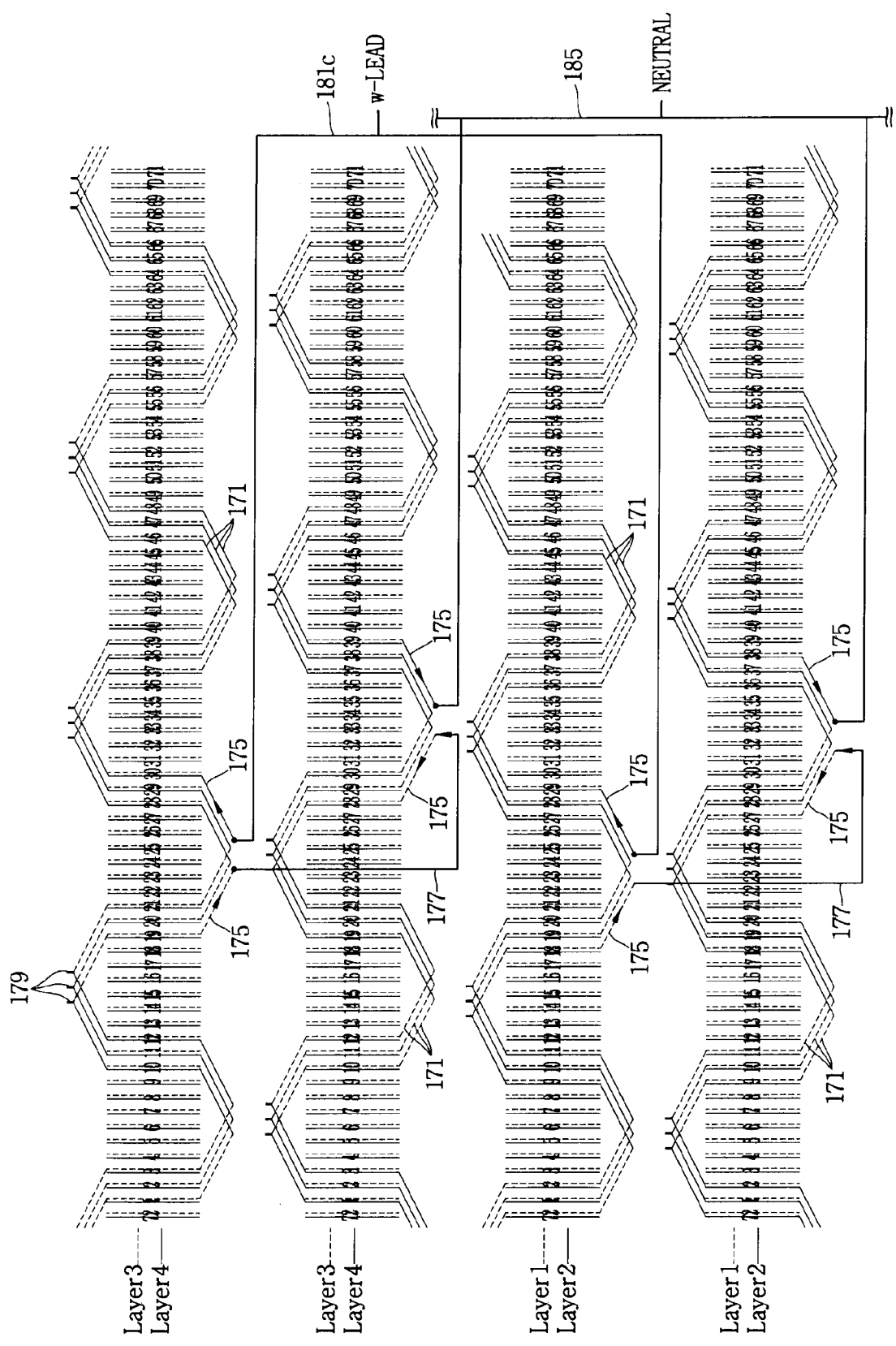

First conductor 171 may be configured such that an interval between two insertion portions 172a is 9 slot pitches. For example, first conductor 171 may be configured such that when insertion portion 172a at the one side thereof is inserted into slot 1, insertion portion 172a at the other side thereof is inserted into slot 10 which is a ninth slot along a circumferential direction of stator core 151 toward the one side as illustrated in FIGS. 10A through 10C.

Here, the two insertion portions 172a of first conductor 171 may be inserted into different slots 155 to be disposed at different layers. For example, insertion portion 172a at one side of first conductor 171 may be inserted into layer 3 of the first slot and insertion portion 172a at the other side thereof may be inserted into layer 4 of the tenth slot.

First conductor 171 may be twisted by approximately 180 degrees at connection portion 172b such that the inner and outer surfaces of the two insertion portions 172a are disposed in an opposite direction to each other.

Each extension portion 173 may be inclined and extended in the upward direction toward the outside thereof at an end portion of each insertion portion 172a. Each extension portion 173 may be brought into contact with another extension portion 173 in a conductive manner. An end portion of extension portion 173 may be connected in a conductive manner by a welding, for example. Here, an end portion of each extension portion 173 may be bent to be disposed along the top/down direction. Due to this, lateral surfaces of two extension portions 173 to be welded to each other may be easily brought into contact with each other, thereby facilitating the welding work.

More specifically, extension portion 173 extended in the upward direction from insertion portion 172a inserted into layer 3 of the first slot may be brought into contact with extension portion 173 extended in the upward direction from layer 4 of the 64th slot with each other in a conductive manner. An end portion of extension portion 173 of first conductor 171 inserted into the first slot and an end portion of extension portion 173 of first conductor 171 inserted into the 64th slot may be disposed with a welding portion 179 at which lateral surfaces thereof are welded in a state of being brought into contact with each other in a conductive manner approximately at an upper side of the 68th slot and 69th slot.

Part of first conductor 171 may be configured such that an interval between the two insertion portions 172a is 8 slot pitches.

More specifically, it may be configured such that insertion portion 172a at one side thereof is inserted into slot 14 and insertion portion 172a at the other side thereof is inserted into slot 22 which is the eighth slot thereafter as illustrated in FIG. 10A.

Figure 7:
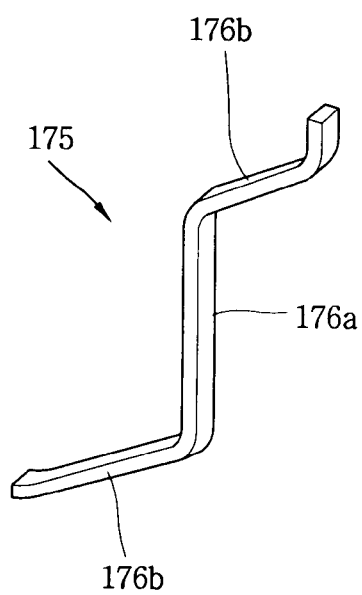
FIG. 7 illustrates a second conductor of the segment conductor in FIG. 2.

Segment conductor 170 may be configured to have a second conductor 175 having an insertion portion 176a inserted into slot 155, and a plurality of extension portions 176b extended from both end portions of the insertion portion 176a, respectively, as illustrated in FIG. 7.

Second conductor 175 may be configured with an approximately half shape of first conductor 171 from which a central portion of first conductor 171 is cut. For example, an end portion of second conductor 175 may be connected to neutral line 185 or lead wire 180.

As illustrated in FIG. 10A, a lead wire 181a of the u-phase 162a may be connected to an end portion of extension portion 176b at a lower side of second conductor 175 inserted into layer 4 of the 24th slot on the drawing.

Furthermore, a neutral line 185 may be connected to an end portion of extension portion 176b at a lower side of second conductor 175 inserted into layer 4 of the 33rd slot.

Furthermore, an end of connection conductor 177 may be connected to an end portion of extension portion 176b at a lower side of second conductor 175 inserted into layer 3 of the 13th slot, and the other end thereof may be connected to an end portion of extension portion 176b at a lower side of second conductor 175 inserted into layer 3 of the 22nd slot. Here, connection conductor 177 may be configured with a copper wire having a rectangular cross section. The length of the connection conductor 177 may be properly controlled.

On the other hand, stator winding 161 may include a first winding portion 163 and a second winding portion 164 for each phase as illustrated in FIGS. 10A through 10C.

For example, first winding portion 163 for each phase may be configured by connecting segment conductors 170 forming a first layer and a second layer. First winding portion 163 may be configured by connecting segment conductors 170 disposed on the first layer and the second layer in series with each other.

Furthermore, second winding portion 164 for each phase may be configured by connecting segment conductors 170 forming a third layer and a fourth layer. Second winding portion 164 may be configured by connecting segment conductors 170 disposed on the third layer and the fourth layer in series with each other. Here, first winding portion 163 for each phase may be also configured by connecting a first layer with a third layer, and second winding portion 164 may be also configured by connecting a second layer with a fourth layer.

For the each stator winding 161, first winding portion 163 and second winding portion 164 for each phase may be configured with eight poles, and six turns for each pole. In other words, first winding portion 163 and second winding portion 164 may be configured to have six insertion portions for each pole (insertion portions 172a of first conductor 171 and/or insertion portions 176b of second conductor 175).

On the other hand, stator winding 161 may be configured such that one pole for each phase (u-phase 162a, v-phase 162b, w-phase 162c) is distributed over three slots. Due to this, it may be possible to reduce a cross-sectional area of segment conductor 170 inserted into each slot 155.

When an alternating current power source with frequencies above a predetermined frequency is applied to each segment conductor 170, the resistance (effective resistance) at a central portion of each segment conductor 170 may be drastically increased due to a so-called skin effect. Due to this, the efficiency may be drastically reduced.

Figure 14:
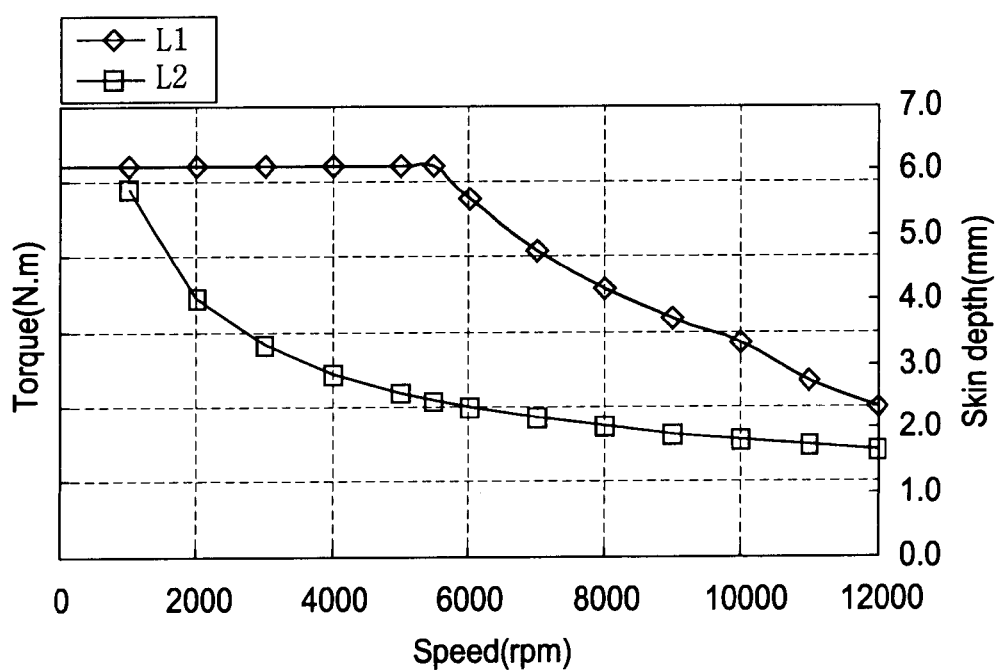
FIG. 14 illustrates a relationship among a number of rotations and a torque of the stator winding for different cross sectional areas of the segment conductor in FIG. 2.

Referring to FIG. 14, it is seen that a torque of electromotor 140 maintains a relatively high level with no big change at a relatively low number of rotations (frequency), but the torque is drastically reduced above approximately 6000 rpm as illustrated with a first curve (L1).

Furthermore, it is seen that a skin depth of each segment conductor 170 is gradually reduced as increasing the number or rotations (frequency) of electromotor 140 as illustrated with a second curve (L2).

According to an embodiment of the present disclosure, the number of turns for each pole may be increased to reduce a cross-sectional area of each segment conductor 170 and suppress an increase of resistance caused by the skin effect, thereby enhancing the efficiency.

Furthermore, the number of rotations may be increased by increasing the number of turns for each pole and connecting them in parallel with one another. Due to this, it may be possible to enhance the electromotor output.

Furthermore, when the same output is maintained, the number of rotations may be increased, thereby reducing the size of the electromotor (stator 150 and rotor 190) to the extent.

More specifically, stator winding 161 may be configured such that the conductors or coils (in effect, insertion portions 172a of first conductor 171 and/or insertion portions 176a of second conductor 175, hereinafter, abbreviated as "insertion portions") having the same phase (u-phase 162a, v-phase 162b, w-phase 162c) and having the same current direction are distributed over four slots as illustrated in FIGS. 10A through 10C and 11. As a result, it may be possible to reduce the torque ripple and reduce the vibration and noise. Due to this, it may be possible to implement and/or provide an electromotor configured with a relatively small size and rotated at high speed while maintaining the same output with a lower vibration and noise.

Figure 11:
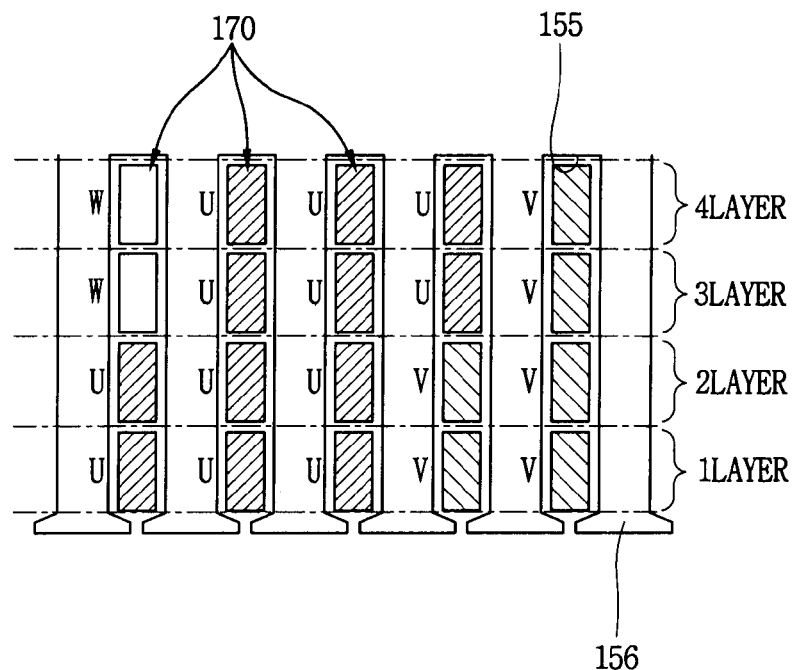
FIGS. 11 through 13 are views for explaining the arrangement of a segment conductor in FIG. 3.

As illustrated in FIG. 11, in case of the u-phase 162a as an example, it may be disposed with six insertion portions inserted into a first layer and a second layer of the 12th to 14th slots and six insertion portions inserted into a third layer and a fourth layer of the 13th to 15th slots.

Here, the six insertion portions inserted into a first layer and a second layer of the 12th to 14th slots may constitute one pole of first winding portion 163, and the six insertion portions inserted into a third layer and a fourth layer of the 13th to 15th slots may constitute one pole of second winding portion 164. The one pole of first winding portion 163 and the one pole of second winding portion 164 may be disposed to be separated from each other by one slot pitch along the circumferential direction.

Figure 12:
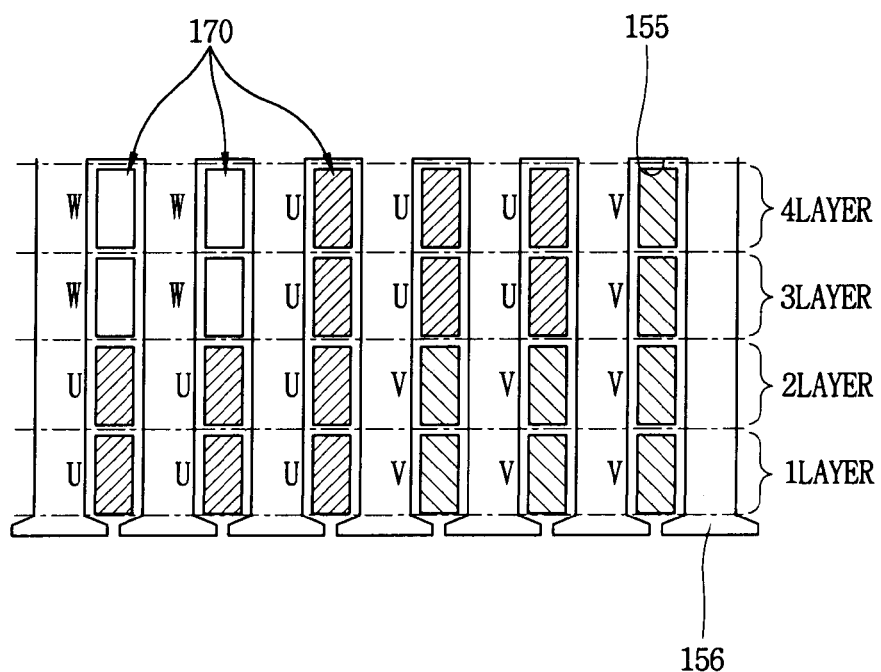

Stator winding 161 may be configured such that the insertion portions having the same phase as well as having the same current direction are disposed at five slots as illustrated in FIG. 12. Due to this, it may be possible to reduce the torque ripple and reduce the vibration and noise.

More specifically, the one pole of first winding portion 163 and the one pole of second winding portion 164 may be disposed to be separated from each other by two slot pitches along the circumferential direction. For example, the one pole of second winding portion 164 in which three insertion portions are inserted into the third layer and the fourth layer, respectively, may be disposed with an interval of two slot pitches to one another, compared to the one pole of first winding portion 163 in which three insertion portions are sequentially disposed at the first layer and the second layer, respectively, as illustrated in FIG. 12.

Figure 13:
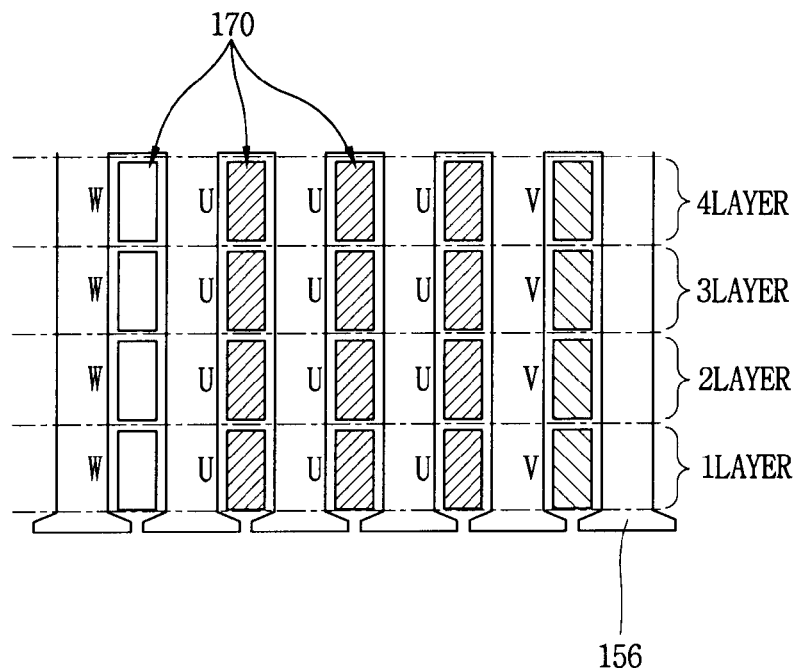

Furthermore, stator winding 161 may be configured such that the insertion portions having the same phase as well as having the same current direction are disposed at three slots as illustrated in FIG. 13. Due to such a configuration, it may be possible to increase the torque ripple and increase the vibration and noise compared to the foregoing configuration in connection with FIGS. 11 and 12. However, it may be possible to increase the number of segment conductors 170 and reduce a cross-sectional area of each of the segment conductors 170 compared to the related art, thereby enhancing the efficiency. Furthermore, the increased number of segment conductors 170 may be divided into a suitably number and connected in parallel with each other to increase the rotation speed, thereby allowing rotation at high speed.

Segment conductor 170 according to the present embodiment may have a rectangular cross section, and at least one edge of the cross section of segment conductor 170 may be configured above 1.7 mm. Due to this, it may be possible to enhance the operation efficiency. For example, segment conductor 170 may be configured to have a rectangular shaped cross section with a smaller edge size of 1.7 mm.

Hereinafter, stator winding 161 according to the present embodiment will be described by taking a case where the insertion portions having the same phase as well as having the same current direction are disposed at four slots as an example as illustrated in FIGS. 3 and 10A through 10C.

Segment conductors 170 (first conductor 171 and/or second conductor 175) may be inserted into each slot 155 of stator core 151, respectively. Four insertion portions may be inserted into each slot 155, respectively, to be separated from one another along the radial direction.

Each phase of stator winding 161 may have first winding portion 163 and second winding portion 164 connected in parallel with each other, and first winding portion 163 and second winding portion 164 for each phase may be configured to have a first coil portion 165a and a second coil portion 165b connected in series with each other.

More specifically, referring to FIGS. 3 and 10A through 10C, an end portion of first coil portion 165a of first winding portion 163 in the u-phase 162a may be disposed at layer 2 of the 23rd slot such that a lower end thereof is connected to a lead wire 181a of the u-phase 162a, and the other end portion of first coil portion 165a may be disposed at layer 3 of the 25th slot.

An end portion of second coil portion 165b of first winding portion 163 in the u-phase 162a may be disposed at layer 2 of the 21st slot such that a lower end thereof is connected to first coil portion 165a by means of the connection conductor 177, and the other end portion of the second coil portion 165b may be disposed at layer 2 of the 32nd slot such that a lower end thereof is connected to neutral line 185.

An end portion of first coil portion 165a of second winding portion 164 in the u-phase 162a may be disposed at layer 4 of the 24th slot and a lower end thereof may be connected to a lead wire 180 of the u-phase 162a. The other end portion of first coil portion 165a may be disposed at layer 3 of the 13th slot.

An end portion of second coil portion 165b of second winding portion 164 in the u-phase 162a may be disposed at layer 3 of the 22nd slot and a lower end portion thereof may be connected to first coil portion 165a of second winding portion 164 by means of connection conductor 177. The other end portion of second coil portion 165b of second winding portion 164 may be disposed at layer 4 of the 33rd slot and a lower end portion thereof may be connected to neutral line 185.

An end portion of first coil portion 165a of first winding portion 163 in the v-phase 162b may be disposed at layer 2 of the 35th slot such that a lower end thereof is connected to a lead wire 180 of the v-phase 162b. The other end portion of first coil portion 165a may be disposed at layer 1 of the 24th slot.

An end portion of second coil portion 165b of first winding portion 163 in the v-phase 162b may be disposed at layer 1 of the 33rd slot and a lower end thereof may be connected to first coil portion 165a by means of connection conductor 177. The other end portion of second coil portion 165b may be disposed at layer 4 of the 44th slot and a lower end thereof may be connected to neutral line 185.

An end portion of first coil portion 165a of second winding portion 164 in the v-phase 162b may be disposed at layer 4 of the 36th slot and a lower end thereof may be connected to a lead wire 181b of the v-phase 162b. The other end portion of first coil portion 165a may be disposed at layer 3 of the 25th slot.

An end portion of second coil portion 165b of second winding portion 164 in the v-phase 162b may be disposed at layer 3 of the 34th slot and a lower end portion thereof may be connected to first coil portion 165a by means of connection conductor 177. The other end portion of second coil portion 165b may be disposed at layer 4 of the 45th slot and a lower end portion thereof may be connected to neutral line 185.

An end portion of first coil portion 165a of first winding portion 163 in the w-phase 162c may be disposed at layer 2 of the 29th slot and a lower end thereof may be connected to a lead wire 181c of the w-phase 162c. The other end portion of first coil portion 165a may be disposed at layer 1 of the 18th slot.

An end portion of second coil portion 165b of first winding portion 163 in the w-phase 162c may be disposed at layer 1 of the 27th slot and a lower end thereof may be connected to first coil portion 165a by means of connection conductor 177. The other end portion of second coil portion 165b may be disposed at layer 2 of the 38th slot and a lower end thereof may be connected to neutral line 185.

An end portion of first coil portion 165a of second winding portion 164 in the w-phase 162c may be disposed at layer 4 of the 30th slot and a lower end thereof may be connected to a lead wire 181c of the w-phase 162c. The other end portion of first coil portion 165a may be disposed at layer 1 of the 18th slot.

An end portion of second coil portion 165b of second winding portion 164 in the w-phase 162c may be disposed at layer 3 of the 28th slot and a lower end portion thereof may be connected to first coil portion 165a by means of connection conductor 177. The other end portion of second coil portion 165b may be disposed at layer 4 of the 39th slot and a lower end portion thereof may be connected to neutral line 185.

Lead wires 181a, 181b, 181c may be connected to the inverter device 130, respectively. Due to this, a driving power source converted by inverter device 130 may be provided to each phase.

Due to such a configuration, inverter device 130 may convert a direct current power source provided from battery 125 into a driving power source at a predetermined frequency (for example, 800 Hz) to provide it to electromotor 140.

When a driving power source provided from inverter device 130 is applied to stator winding 161, stator winding 161 may form a rotational magnetic field. Due to this, rotor 190 may be rotated around rotation shaft 197 by an interaction between magnet 195 and the rotational magnetic field.

The rotational force of rotor 190 may be decelerated to a predetermined deceleration ratio (for example, 8.5:1) through decelerator 135 connected to rotation shaft 197 and transferred to wheels 115.

As stated above, features of the present disclosure are illustrated and described with respect to specific embodiments. However, features of the present disclosure may be implemented in a various forms without departing from the concept or gist of the disclosure, and accordingly, it is intended that the embodiment described above not be limited by the detailed description provided herein.

Moreover, even if any embodiment is not specifically disclosed in the foregoing detailed description, it should be broadly construed within the scope of the technical spirit, as defined in the accompanying claims. Furthermore, all modifications and variations included within the technical scope of the claims and their equivalents should be covered by the accompanying claims.

The invention claimed is:

1. An electric machine, comprising:
a stator core having a plurality of slots; and
a stator winding in which a winding having a rectangular shaped cross section or circular shaped cross section is wound in series around the slot,
wherein the stator winding has a plurality of winding portions for each phase,
each of the winding portions has a plurality of segment conductors inserted into four or more slots sequentially disposed along a circumferential direction such that there are three or more slots for each pole and each phase, and
segment conductors with different phases are simultaneously inserted into at least any one of the four or more slots of each of winding portions,
wherein the stator winding has a plurality of winding portions connected in parallel with one another for each phase, and
each of the winding portions has a plurality of poles, and
each of the winding portions has a first layer through a fourth layer,
when each of the poles is disposed at five slots, a first layer and a second layer of the first and second slots and a third layer and a fourth layer of the fourth and fifth slots among the five slots of the one pole have the same phase along a circumferential direction of the stator core, and a second layer and the third layer of the fourth and firth slots have different phases,
wherein a first layer through a fourth layer of the third slot among the five slots of the one pole have the same phase,
wherein the first layer of the first slot and the first layer of the third slot have the same phase, and
wherein the second layer and a third layer of the first and second slots have different phases.

2. The electric machine of claim 1, wherein the winding portion for each phase has a plurality of winding portions connected in parallel with one another.

3. The electric machine of claim 2, wherein the segment conductor has a first layer through a fourth layer separated from one another in a radial direction within the each slot, and the each segment conductor comprises:

a first conductor having a pair of insertion portions inserted into different slots from each other, and a connection portion connecting the insertion portions to each other, and extension portions extended from the insertion portions, respectively; and
a second conductor having an insertion portion inserted into the slot, and a plurality of extension portions extended from both end portions of the insertion portion, respectively.

4. An electromotor, comprising:
the electric machine of claim 2; and
a rotor rotatably disposed with respect to the electric machine,
wherein the electric machine and rotor are configured to rotate at 12000 through 24000 rpm.

5. An electric vehicle, comprising:
a vehicle body;
a battery provided in the vehicle body;
an electromotor of claim 4 provided in the vehicle body to provide a driving force to the vehicle body.

6. The electric machine of claim 5, wherein the vehicle body has a plurality of wheels, and further comprises a decelerator provided between the electromotor and the wheel, and wherein the decelerator has a deceleration ratio of 5.5:1 to 10:1.

7. The electromotor of claim 5, wherein the stator core has 36 through 72 slots, and the stator winding has a plurality of winding portions connected in parallel with one another with the number of 2 to 8 in parallel for each phase, and
the stator winding has 3 to 10 poles, and
alternating current power of 500 to 1000 Hz is applied to the stator winding.

8. The electric machine of claim 1, wherein the stator winding has a plurality of lead wires connecting each phase power to a winding portion, and
the stator winding has a first winding portion and a second winding portion connected to in parallel with each other, and
each lead wire has a power connecting portion connected to a power source, and a first branch portion and a second branch portion branched from the power connecting portion and connected to each of one ends of the first winding portion and the second winding portion, respectively.

9. The electric machine of claim 8, wherein the stator winding has a neutral line connecting each of the other ends of the first winding portion and the second winding portion,
wherein the neutral line has a first branch portion through a sixth branch portion connected to each phase of the first winding portion and the second winding portion, and
wherein the first winding portion and the second winding portion are disposed such that the poles of the same phase are separated from one another by one slot or two slots in a circumferential direction of the stator core.

10. An electromotor, comprising:
the electric machine of claim 1; and
a rotor rotatably disposed with respect to the electric machine,
wherein the electric machine and rotator are configured to rotate at 12000 through 24000 rpm.

* * * * *